United States Patent
Su et al.

(10) Patent No.: US 12,476,530 B2
(45) Date of Patent: Nov. 18, 2025

(54) INDUCTOR CURRENT RECONSTRUCTION CIRCUIT AND METHOD FOR USE IN SWITCHED-MODE POWER SUPPLY

(71) Applicant: HANGZHOU BRIGHT POWER SEMICONDUCTOR CO., LTD., Zhejiang (CN)

(72) Inventors: Xiaohua Su, Zhejiang (CN); Linbo Wang, Zhejiang (CN)

(73) Assignee: HANGZHOU BRIGHT POWER SEMICONDUCTOR CO., LTD., Zhejiang (CN)

( * ) Notice: Subject to any disclaimer, the term of this patent is extended or adjusted under 35 U.S.C. 154(b) by 226 days.

(21) Appl. No.: 18/535,384

(22) Filed: Dec. 11, 2023

(65) Prior Publication Data

US 2024/0223065 A1 Jul. 4, 2024

(30) Foreign Application Priority Data

Dec. 28, 2022 (CN) .......................... 202211700417.X (51) Int. Cl.
*H02M 1/00* (2006.01)
*H02M 3/155* (2006.01)

(52) U.S. Cl.
CPC ......... *H02M 1/0009* (2021.05); *H02M 3/155* (2013.01)

(58) Field of Classification Search
CPC .... H02M 1/0009; H02M 3/155; H02M 3/156; H02M 1/08; H02M 3/158
See application file for complete search history.

(56) References Cited

U.S. PATENT DOCUMENTS

| | | | | |
|---|---|---|---|---|
| 7,372,241 | B1* | 5/2008 | Tomiyoshi | H02M 3/1588 323/283 |
| 9,853,548 | B1* | 12/2017 | Zhang | H02M 1/08 |
| 11,677,306 | B2* | 6/2023 | Fang | H02M 3/156 323/282 |
| 12,244,229 | B2* | 3/2025 | Fang | H02M 3/158 |

* cited by examiner

*Primary Examiner* — Kyle J Moody
(74) *Attorney, Agent, or Firm* — MUNCY, GEISSLER, OLDS & LOWE, P.C.

(57) ABSTRACT

An inductor current reconstruction circuit for use in switched-mode power supply, as well as a reconstruction method thereof are disclosed. In reconstruction circuit, an inductor current sampling circuit is employed to detect current through switch transistor during on-time and thereby output sampled voltage, and a slope of sampled voltage is compared with a voltage slope of a reconstructed signal. If the two are unequal, the generator circuit is adjusted so that the voltage slope of reconstructed signal becomes equal to that of sampled voltage. The voltage of reconstructed signal can characterize the waveform of an inductor current. This reconstruction circuit allows signal reconstruction to be extended from one on-time of switch transistors, whichever is longer, to the other on-time, thereby achieving inductor current reconstruction over each entire period. The inductor current reconstruction circuit provided is particularly suitable for use in applications with a relatively large or small duty cycle.

13 Claims, 5 Drawing Sheets

INDUCTOR CURRENT RECONSTRUCTION CIRCUIT AND METHOD FOR USE IN SWITCHED-MODE POWER SUPPLY

CROSS-REFERENCES TO RELATED APPLICATION

This application claims the priority of Chinese patent application number 202211700417X, filed on Dec. 28, 2022, the entire contents of which are incorporated herein by reference.

TECHNICAL FIELD

The present invention relates to the field of electrical and electronic technologies and, in particular, to an inductor current reconstruction circuit and method for use in a switched-mode power supply.

BACKGROUND

At present, DC/DC switched-mode power supplies are being widely used to provide voltages and currents required by loads. In these applications, real-time inductor current detection is necessary for system control and protection by switched-mode power supplies based on the detected inductor current signals. However, inductor current detection methods employed in common chips typically require a leading edge blanking time and are therefore not suitable for use in applications with a relatively small or large duty cycle.

SUMMARY OF THE INVENTION

It is an objective of the present invention to provide an inductor current reconstruction circuit for use in a switched-mode power supply, which can provide a high-precision reconstructed inductor current signal by means of dynamic real-time adjustments made based on slope measurements of an associated inductor current.

To this end, the present invention provides an inductor current reconstruction circuit for use in a switched-mode power supply. The switched-mode power supply includes series-connected high-side and low-side switch transistors and an inductor. A first terminal of the inductor is connected to a first terminal of the low-side switch transistor, and a second terminal of the inductor is connected to an output terminal of the switched-mode power supply. The inductor current reconstruction circuit includes an inductor current sampling circuit and an inductor current generator circuit. The inductor current sampling circuit is configured to detect a current through the high-side or low-side switch transistor and thereby output a sampled voltage. The inductor current generator circuit includes a resistor, an operational amplifier, a current-controlled current source and a capacitor and slope comparator. A first terminal of the resistor is connected to the first terminal of the low-side switch transistor, and a second terminal of the resistor is connected to a first terminal of the current-controlled current source. A positive input terminal of the operational amplifier is configured to receive an output voltage from the switched-mode power supply or a filtered voltage from the switched-mode power supply. A negative input terminal of the operational amplifier is connected to the second terminal of the resistor, and an output terminal of the operational amplifier is connected to a control terminal of the current-controlled current source. A first terminal of the capacitor is connected to a second terminal of the current-controlled current source and serves as a reconstructed signal node. The capacitor is grounded at its second terminal. The current-controlled current source is configured to charge or discharge the capacitor according to a current through the resistor. A negative input terminal of the slope comparator is connected to the first terminal of the capacitor, and a positive input terminal of the slope comparator is configured to receive the sampled voltage and compare its voltage slope with a voltage slope at the reconstructed signal node. An output terminal of the slope comparator is connected to the resistor and/or the capacitor and configured to, when the voltage slope of the sampled voltage is not equal to the voltage slope at the reconstructed signal node, adjust the resistance of the resistor and/or the capacitance of the capacitor so that the voltage slope at the reconstructed signal node becomes equal to the voltage slope of the sampled voltage.

Optionally, the inductor current sampling circuit may be configured to detect the current through the high-side switch transistor and thereby output the sampled voltage, wherein the slope comparator is configured to receive the sampled voltage and the voltage at the reconstructed signal node, compare the voltage slope of the sampled voltage with the voltage slope at the reconstructed signal node and make the voltage slope at the reconstructed signal node equal to the voltage slope of the sampled voltage.

Optionally, the current-controlled current source may be configured to charge the capacitor during an on-time of the high-side switch transistor and discharge the capacitor during an on-time of the low-side switch transistor so that the voltage slope at the reconstructed signal node is the same as a slope of a current through the inductor.

Optionally, the inductor current sampling circuit may be configured to detect the current through the low-side switch transistor and thereby output the sampled voltage, wherein the slope comparator is configured to receive the sampled voltage and the voltage at the reconstructed signal node, compare the voltage slope of the sampled voltage with the voltage slope at the reconstructed signal node and make the voltage slope at the reconstructed signal node equal to the voltage slope of the sampled voltage.

Optionally, the current-controlled current source may be configured to charge the capacitor during an on-time of the high-side switch transistor and discharge the capacitor during an on-time of the low-side switch transistor so that the voltage slope at the reconstructed signal node is the same as a slope of a current through the inductor.

Optionally, the inductor current sampling circuit may include a current-controlled voltage source for generating the sampled voltage based on the detected current through the high-side or low-side switch transistor.

Optionally, the inductor current generator circuit may further include a first switch, a second switch and a third switch, the first switch connected between an output terminal of the inductor current sampling circuit and the positive input terminal of the slope comparator, the second switch connected between the reconstructed signal node and the positive input terminal of the slope comparator, the third switch connected between the output terminal of the inductor current sampling circuit and the reconstructed signal node.

Optionally, an on-time of the high-side or low-side switch transistor may include a blanking interval, a detection interval and a calibration interval, wherein: in the blanking interval, the first switch is opened, the second switch is closed, and the third switch is opened, causing the slope comparator to receive the voltage at the reconstructed signal node at both its positive and negative input terminals; and in the detection interval, the first switch is closed, the second switch is opened, and the third switch is opened, causing the slope comparator to receive the sampled voltage and the voltage at the reconstructed signal node at its positive and negative input terminals, respectively; and in the calibration interval, the first switch is closed, the second switch is opened, and the third switch is closed, thereby connecting the reconstructed signal node to the output terminal of the inductor current sampling circuit and making the voltage at the reconstructed signal node equal to the sampled voltage.

The present invention also provides an inductor current reconstruction method using the inductor current reconstruction circuit as defined above, which includes: detecting a current through the high-side or low-side switch transistor and thereby outputting a sampled voltage by the inductor current sampling circuit; during an on-time of the high-side or low-side switch transistor, comparing a voltage slope of the sampled voltage with a voltage slope at the reconstructed signal node and, when the voltage slope of the sampled voltage is not equal to the voltage slope at the reconstructed signal node, adjusting the resistance of the resistor and/or the capacitance of the capacitor in the inductor current generator circuit so that the voltage slope at the reconstructed signal node becomes equal to the voltage slope of the sampled voltage.

Optionally, the inductor current sampling circuit may detect the current through the high-side switch transistor and thereby output the sampled voltage, and during the on-time of the high-side switch transistor, the sampled voltage may be received and its voltage slope may be compared with the voltage slope at the reconstructed signal node, followed by the voltage slope at the reconstructed signal node being made equal to the voltage slope of the sampled voltage, wherein the inductor current reconstruction method further includes, charging the capacitor during the on-time of the high-side switch transistor and discharging the capacitor during the on-time of the low-side switch transistor so that the voltage slope at the reconstructed signal node is the same as a current through the inductor.

Optionally, the inductor current sampling circuit may detect the current through the low-side switch transistor and thereby output the sampled voltage, and during the on-time of the low-side switch transistor, the sampled voltage may be received and its voltage slope may be compared with the voltage slope at the reconstructed signal node, followed by the voltage slope at the reconstructed signal node being made equal to the voltage slope of the sampled voltage, wherein the inductor current reconstruction method further includes, charging the capacitor during the on-time of the high-side switch transistor and discharging the capacitor during the on-time of the low-side switch transistor so that the voltage slope at the reconstructed signal node is the same as a current through the inductor.

Optionally, the on-time of the high-side or low-side switch transistor may include a blanking interval, a detection interval and a calibration interval, wherein: in the blanking interval, the slope comparator receives a voltage at the reconstructed signal node at both its positive and negative input terminals; in the detection interval, the slope comparator receives the sampled voltage and the voltage at the reconstructed signal node at its positive and negative input terminals, respectively, and compares the voltage slope of the sampled voltage with the voltage slope at the reconstructed signal node; and in the calibration interval, the reconstructed signal node is connected to the output terminal of the inductor current sampling circuit, thereby making the voltage at the reconstructed signal node equal to the sampled voltage.

The present invention also provides a switched-mode power supply including the inductor current reconstruction circuit as defined above, wherein the inductor current sampling circuit is configured to detect a current through the high-side or low-side switch transistor and thereby output a sampled voltage, and the inductor current generator circuit is connected to a node between the low-side and high-side switch transistors.

In the proposed inductor current reconstruction circuit for use in a switched-mode power supply, the inductor current sampling circuit detects a current through one of the switch transistors (the high-side or low-side switch transistor) and thereby outputs a sampled voltage Vcs. Moreover, during an on-time of the switch transistor, the sampled voltage Vcs is tracked and its slope is compared with a voltage slope of a reconstructed signal. If the two are unequal, the resistor R and/or the capacitor C in the inductor current generator circuit may be adjusted according to the slope of the sampled voltage Vcs so that the slope of the voltage Vmon of the generated reconstructed signal becomes equal to the slope profile of the sampled voltage Vcs. Additionally, since the slope of the sampled voltage Vcs is equal to that of the inductor current $I_L$, the voltage Vmon of the reconstructed signal generated by the inductor current reconstruction circuit can exactly characterize a waveform of the inductor current $I_L$. Thus, the adjusted inductor current generator circuit can generate a simulated reconstructed signal capable of precisely characterizing the waveform of the inductor current $I_L$ throughout each entire switching period. That is, the reconstruction circuit can reconstruct the waveform of the inductor current $I_L$ over each entire switching period. In this way, the resulting reconstructed signal varies at the same slope as the inductor current, and real-time tracking and detection of the inductor current $I_L$ can be achieved.

The proposed inductor current reconstruction circuit is particularly suitable for use in application with a relatively large or small duty cycle. Specifically, during one of the on-times of the switch transistors, whichever is longer, high-precision inductor current reconstruction (e.g., without involving a blanking time and with increased reconstruction precision) and precise adjustment to the generator circuit may be conducted. With the adjusted inductor current generator circuit, the reconstruction circuit can simulate a reconstructed signal capable of precisely characterizing the inductor current $I_L$, during the other on-time which is shorter. This effectively solves the problem that conventional circuits used in applications with a relatively small or large duty cycle could not precisely reconstruct an inductor current over an entire period.

DETAILED DESCRIPTION

Inductor current reconstruction circuits and methods for use in a switched-mode power supply provided in herein will be described below in greater detail by means of specific examples with reference to the accompanying drawings. From the following description, advantages and features of the present invention will become more apparent. Note that the drawings are provided in a very simplified form not necessarily drawn to exact scale for the only purpose of helping to explain the disclosed examples in a more convenient and clearer way. It will be understood that when an element is referred to as being "connected to" or "coupled to" another element, it can be directly connected or coupled to the other element, or intervening elements may also be present. In contrast, when an element is referred to as being "directly connected to" another element, there are no intervening elements.

Embodiment 1

Figure 1:
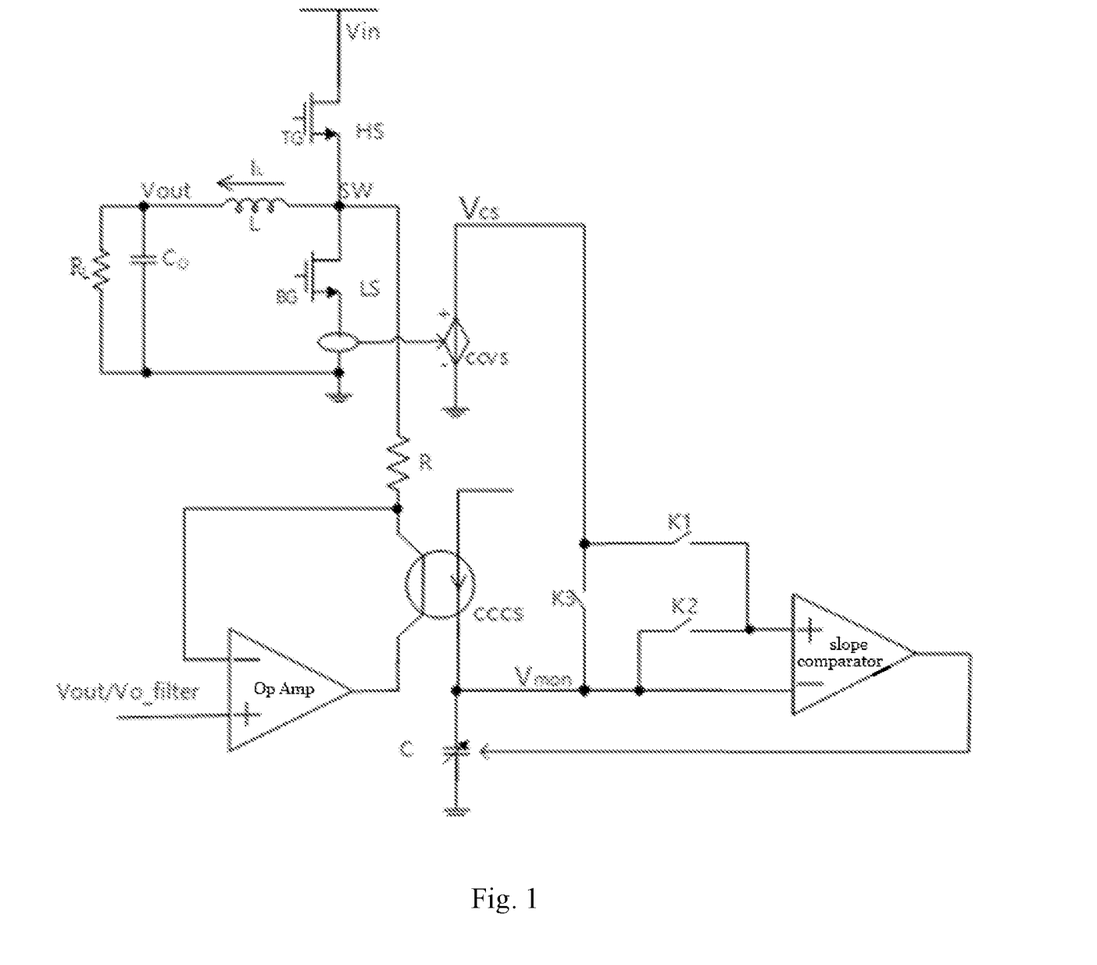
FIG. 1 is a schematic illustration of a circuit including an inductor current reconstruction circuit according to a first embodiment of the present invention.
Figure 2:
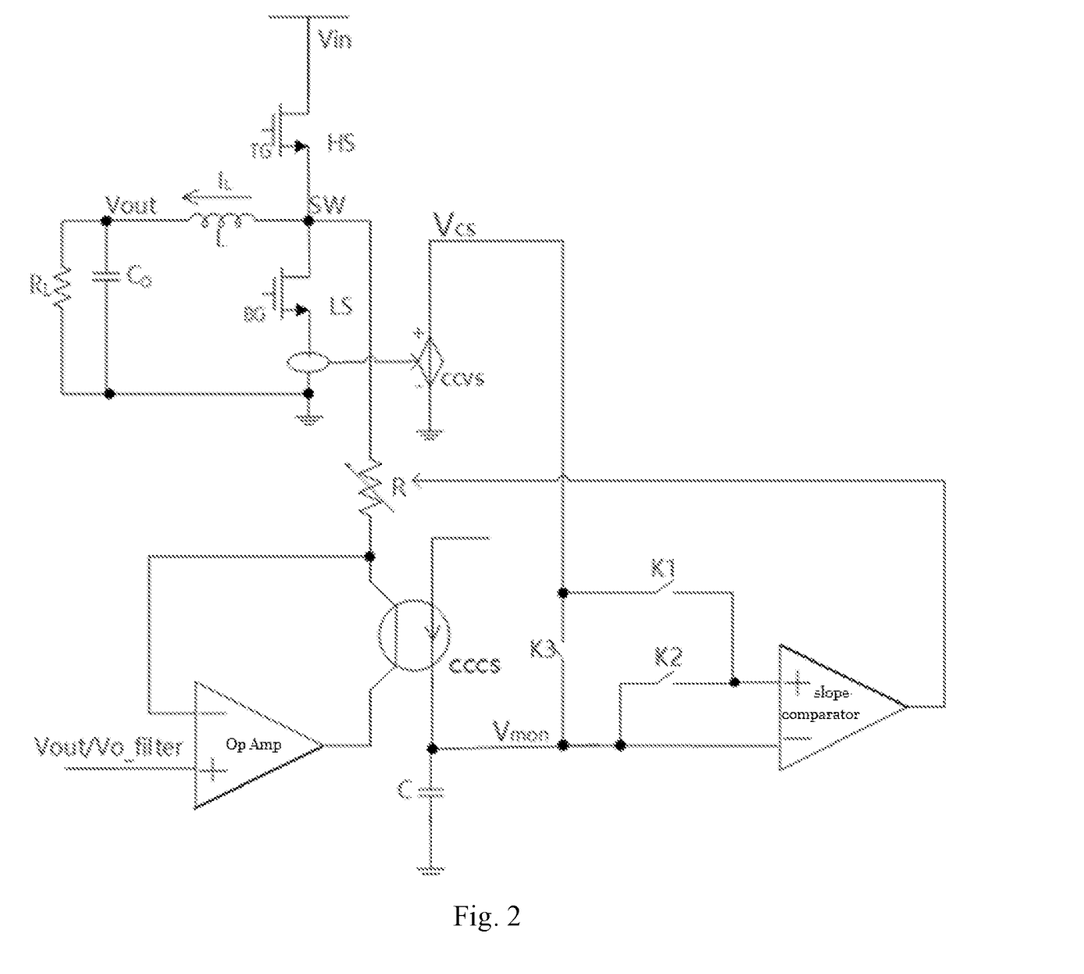
FIG. 2 is a schematic illustration of another circuit including an inductor current reconstruction circuit according to the first embodiment of the present invention.

FIG. 1 is a schematic illustration of a circuit including an inductor current reconstruction circuit according to a first embodiment of the present invention, and FIG. 2 is a schematic illustration of another circuit including the inductor current reconstruction circuit according to the first embodiment of the present invention. The switched-mode power supply includes series-connected high-side HS and low-side LS switch transistors and an inductor L. A first terminal of the inductor L is connected to a first terminal of the low-side switch transistor LS, and a second terminal of the inductor L is connected to an output terminal of the switched-mode power supply. A first terminal of the high-side switch transistor HS is connected to a power supply Vin, and a second terminal of the high-side switch transistor HS is connected to the first terminal of the low-side switch transistor LS. A second terminal of the low-side switch transistor LS is grounded. The switched-mode power supply includes an output capacitor $C_O$ and a load $R_L$. A first terminal of the output capacitor $C_O$ is connected to the second terminal of the inductor L, and a second terminal of the output capacitor $C_O$ is grounded. The load $R_L$ is parallel-connected to the output capacitor $C_O$. That is, it is connected to both ends of the output capacitor $C_O$. This embodiment is exemplified in the context of a power circuit of the switched-mode power supply being implemented as a buck circuit.

Referring to FIGS. 1 and 2, the inductor current reconstruction circuit includes an inductor current sampling circuit (which includes a current-controlled voltage source ccvs in this embodiment) and an inductor current generator circuit.

The inductor current sampling circuit is configured to output a sampled voltage Vcs by detecting a current through the low-side switch transistor LS, or by detecting a current through the high-side switch transistor HS. This embodiment is exemplified in the context of the inductor current sampling circuit being configured to output the sampled voltage Vcs by detecting the current through the low-side switch transistor LS.

In specific embodiments, the inductor current sampling circuit may include a current-controlled voltage source ccvs. In this embodiment, the inductor current sampling circuit includes a current sampling element such as a current sensor, which is disposed over a wire connecting the second terminal of the low-side switch transistor LS to a grounding terminal and is configured to detect the current through the low-side switch transistor LS. Specifically, the current-controlled voltage source ccvs may generate the sampled voltage Vcs based on the current $I_L$ through the low-side switch transistor LS during an on-time thereof. More specifically, during the on-time of the low-side switch transistor LS, the inductor L, the low-side switch transistor LS and the output capacitor Co may form a freewheeling circuit, and the inductor current $I_L$ is the same as the current flowing through the low-side switch transistor LS. The inductor current $I_L$ decreases linearly at a slope of Vout/L. Accordingly, the sampled voltage Vcs generated by the current-controlled voltage source ccvs may decrease at the same slope (Vout/L) as the inductor current $I_L$.

Additionally, the inductor current generator circuit is configured to track the sampled voltage Vcs in the on-time of one of the low-side switch transistor LS and the high-side switch transistor HS and thereby generate a reconstructed signal varying at the same slope as the sampled voltage Vcs. It is also configured to generate a simulated reconstructed signal during the on-time of the other switch transistor, which also varies at the same slope as the inductor current. In this way, an inductor current waveform can be reconstructed over each entire switching period. In this embodiment, the inductor current generator circuit is configured to track the sampled voltage Vcs in the on-time of the low-side switch transistor LS and generate the reconstructed signal varying at the same slope as the sampled voltage Vcs and the simulated reconstructed signal during the on-time of the high-side switch transistor HS.

In this embodiment, the inductor current generator circuit includes a resistor R, an operational amplifier (Op Amp), a current-controlled current source cccs, a capacitor C and a slope comparator.

A first terminal of the resistor R is coupled to a switching node SW between the high-side switch transistor HS and the low-side switch transistor LS, and a second terminal of the resistor R is coupled to a negative input terminal of the Op Amp and a first terminal of the current-controlled current source cccs. A positive input terminal of the Op Amp is configured to receive an output voltage Vout from the switched-mode power supply or a filtered voltage Vo_filter from the switching node SW. An output terminal of the Op Amp is coupled to a control terminal of the current-controlled current source cccs. A second terminal of the current-controlled current source cccs is coupled to a first terminal of the capacitor C. The current-controlled current source cccs may charge or discharge the capacitor C based on a current through the resistor R.

For example, the positive input terminal of the Op Amp may receive the output voltage Vout from the switched-mode power supply. In this case, during the on-time of the high-side switch transistor HS, the current through the resistor R may be equal to (Vsw−Vout)/R. Based on this current, the current-controlled current source cccs may charge the capacitor C, causing a voltage Vmon of the reconstructed signal at the first terminal of the capacitor C to rise at a slope of (Vsw−Vout)/(R*C). Moreover, during the on-time of the low-side switch transistor LS, the current through the resistor R may be equal to (Vsw−Vout)/R, and the voltage Vsw at the switching node may be 0 V. Accordingly, the capacitor C may be discharged, causing the voltage Vmon of the reconstructed signal at the first terminal of the capacitor C to fall at a slope of Vout/(R*C).

With continued reference to FIGS. 1 and 2, a negative input terminal of the slope comparator receives the voltage Vmon of the reconstructed signal from the first terminal of the capacitor C, and a positive input terminal of the slope comparator is configured to receive the sampled voltage Vcs during the on-time of the low-side switch transistor LS and compare a voltage slope of the sampled voltage Vcs with a voltage slope of the voltage Vmon of the reconstructed signal. An output terminal of the slope comparator is coupled to the resistor R and/or the capacitor C and is configured to, when the voltage slope of the sampled voltage Vcs is not equal to the voltage slope of the voltage Vmon of the reconstructed signal, adjust parameter(s) of the resistor R and/or the capacitor C so that the voltage slope of the sampled voltage Vcs becomes equal to the voltage slope of the voltage Vmon of the reconstructed signal. In this way, the generated voltage Vmon of the reconstructed signal can characterize a waveform of the inductor current $I_L$.

Specifically, the resistor R may be a variable resistor, and/or the capacitor C may be a variable capacitor. As such, the variable resistor and/or the variable capacitor may be adjusted when the voltage slope of the sampled voltage Vcs is not equal to the voltage slope of the voltage Vmon of the reconstructed signal. For example, in an example as shown in FIG. 1, the capacitor C may be a variable capacitor, and when the voltage slopes are unequal, the capacitance of the variable capacitor may be adjusted to make the voltage slopes equal. Moreover, in an example as shown in FIG. 2, the resistor R may be a variable resistor, and when the voltage slopes are unequal, the resistance of the variable resistor may be adjusted to change a charge or discharge current rate and thereby make the voltage slopes equal. Of course, in other embodiments, both a variable resistor and a variable capacitor may be employed, and when the voltage slopes are unequal, the parameter(s) of at least one of the variable resistor and the variable capacitor may be adjusted.

As noted above, during the on-time of the low-side switch transistor LS, the descending slope of the sampled voltage Vcs (i.e., the descending slope of the inductor current $I_L$) is Vout/L, and the descending slope of the voltage Vmon of the reconstructed signal is Vout/(R*C). If the descending slope of the sampled voltage Vcs (i.e., Vout/L) is greater than the descending slope of the voltage Vmon of the reconstructed signal (i.e., Vout/(R*C)), then in the embodiment of FIG. 1, the capacitance of the capacitor C can be reduced, and in the embodiment shown in FIG. 2, the resistance of the resistor R may be reduced. On the contrary, if the descending slope of the sampled voltage Vcs (i.e., Vout/L) is smaller than the descending slope of the voltage Vmon of the reconstructed signal (i.e., Vout/(R*C)), then in the embodiment of FIG. 1, the capacitance of the capacitor C can be increased, and in the embodiment of FIG. 2, the resistance of the resistor R may be increased. In this way, the descending voltage slope of the sampled voltage Vcs (i.e., Vout/L) can be kept substantially the same as the descending voltage slope of the voltage Vmon of the reconstructed signal (i.e., Vout/(R*C)), i.e., Vout/L=Vout/(R*C). Thus, it can precisely characterize the inductor current $I_L$.

It is to be noted that it is just the adjustment made to the resistor R and/or capacitor C during the on-time of the low-side switch transistor LS that makes Vout/L equal to Vout/(R*C). Likewise, an ascending voltage slope of the voltage Vmon of the reconstructed signal ((Vsw−Vout)/(R*C)) can be made equal to an ascending slope of the inductor voltage VL ((Vsw−Vout)/L) during the on-time of the high-side switch transistor HS, i.e., (Vsw−Vout)/(R*C) =(Vsw−Vout)/L. In this way, during the on-time of the high-side switch transistor HS, the simulated reconstructed signal generated by the inductor current generator circuit (mimicking the voltage Vmon of the reconstructed signal) can also precisely characterize the inductor current $I_L$.

In other words, in the inductor current reconstruction circuit provided in this embodiment, the sampled voltage Vcs that varies in the same way as the inductor current $I_L$ is tracked during the on-time of the low-side switch transistor LS, and the resistor R and/or capacitor C in the generator circuit is/are adjusted according to the descending voltage slope of the sampled voltage Vcs to ensure that the descending voltage slope of the generated voltage Vmon of the reconstructed signal is equal to the descending voltage slope of the sampled voltage Vcs. As a result, it can characterize the waveform of the inductor current $I_L$. Moreover, the inductor current generator circuit is adjusted so that the simulated reconstructed signal generated during the on-time of the high-side switch transistor HS can also precisely characterize the waveform of the inductor current $I_L$ in this period. In this way, the waveform of the inductor current $I_L$ can be reconstructed over each entire switching period.

It is to be noted that the inductor current reconstruction circuit provided in this embodiment is particularly suitable for use in switched-mode power supplies with a relatively small duty cycle. Specifically, in applications with a small duty cycle, the on-time of the high-side switch transistor HS may be not long enough to allow successful detection of the current through the high-side switch transistor HS. On the other hand, the on-time of the low-side switch transistor LS is long enough to allow real-time tracking of the sampled voltage Vcs and real-time adjustment of the inductor current generator circuit, which enable the reconstructed signal generated by the inductor current generator circuit to characterize the waveform of the inductor current $I_L$. The waveform reconstruction based on the on-time of the low-side switch transistor LS could be extended to that based on the on-time of the high-side switch transistor HS.

Figure 3:
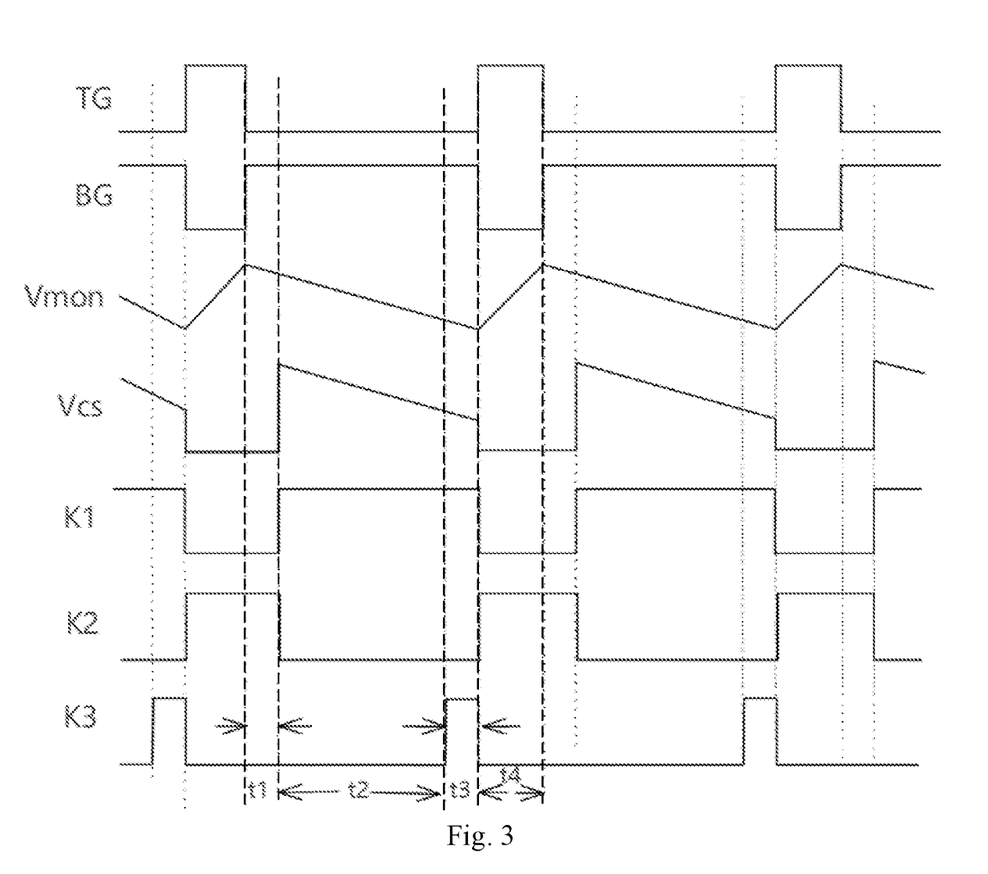
FIG. 3 is a timing diagram of a circuit according to the first embodiment of the present invention.

Further, as shown in FIG. 3, the on-time of the low-side switch transistor LS includes: an initial blanking interval t1, in which the sampled voltage Vcs is not tracked; and a detection interval t2 succeeding the blanking interval t1, in which the sampled voltage Vcs is tracked, and the inductor current generator circuit is adjusted in real time. Specifically, the blanking interval t1 is set because there is significant jitter and instantaneous noise in the low-side switch transistor LS immediately after it is turned on, which can greatly affect detection accuracy. In this blanking interval t1, the current through the low-side switch transistor LS is not sampled, and the sampling of the current through the low-side switch transistor LS starts after the elapse of the blanking interval t1 (the sampled voltage Vcs can characterize the inductor current waveform), allowing high-precision inductor current reconstruction.

Therefore, in applications with a small duty cycle, as the on-time of the low-side switch transistor LS is much longer than the blanking interval t1, tracking of the sampled voltage Vcs and real-time adjustment of the inductor current generator circuit could be accomplished within the on-time of the low-side switch transistor LS.

The on-time of the low-side switch transistor LS may further include a calibration interval t3, in which the voltage Vmon of the reconstructed signal at the reconstructed signal node is aligned with the sampled voltage Vcs so that DC information at the reconstructed signal node (i.e., DC information of the voltage Vmon of the reconstructed signal) is the same as DC information of the sampled voltage Vcs. In other words, after elapse of the detection interval t2 and the calibration interval t3, the voltage Vmon of the reconstructed signal at the reconstructed signal node has both the same voltage value and the same voltage slope as the sampled voltage Vcs and can thus more precisely characterize the waveform of the inductor current $I_L$. In this embodiment, the calibration interval t3 is at the end of the on-time of the low-side switch transistor LS. That is, the voltage Vmon of the reconstructed signal is aligned with the sampled voltage Vcs immediately before the switch transistor LS is turned off. In other implementations, the calibration interval t3 may be any other time interval of the on-time of the low-side switch transistor LS than the blanking interval.

In specific embodiments, a switching circuit may be employed to enable the inductor current generator circuit to perform different functions in different time intervals.

With particular reference to FIGS. 1 and 2, the switching circuit may include a first switch K1, a second switch K2 and a third switch K3. The first switch K1 is connected between an output terminal of the inductor current sampling circuit and the positive input terminal of the slope comparator. The second switch K2 is connected between the reconstructed signal node and the positive input terminal of the slope comparator (i.e., the second switch K2 is connected between the first terminal of the capacitor C and the positive input terminal of the slope comparator). The third switch K3 is connected between the output terminal of the inductor current sampling circuit and the reconstructed signal node.

In the blanking interval t1 of the on-time of the low-side switch transistor LS, the first switch K1 is opened, the second switch K2 is closed, and the third switch K3 is open. As a result, the current through the low-side switch transistor LS is not detected, and the same signal (i.e., the voltage at the reconstructed signal node) is received at both input terminals of the slope comparator. Moreover, a default value is output.

In the detection interval t2 of the on-time of the low-side switch transistor LS, the first switch K1 is closed, the second switch K2 is opened, and the third switch K3 is opened. As a result, the sampled voltage Vcs and the voltage Vmon of the reconstructed signal are received respectively at the two input terminals of the slope comparator, and their slopes are compared thereby. A result of the comparison is fed back to the capacitor C and/or the resistor R.

In the calibration interval t3 of the on-time of the low-side switch transistor LS, the first switch K1 is closed, the second switch K2 is opened, and the third switch K3 is closed. As a result, the reconstructed signal node is connected to the output terminal of the inductor current sampling circuit, making the voltage Vmon of the reconstructed signal at the reconstructed signal node and the sampled voltage Vcs have the same voltage value and hence the same DC information. At the same time, as the same value is present at both input terminals of the slope comparator, the capacitance C or the resistance R will not be changed.

In the on-time of the high-side switch transistor HS t4, the first switch K1 is opened, the second switch K2 is closed, and the third switch K3 is opened. As such, the current through the low-side switch transistor LS is not sampled, and the adjusted inductor current generator circuit generates the simulated reconstructed signal.

On the basis of the inductor current reconstruction circuit as defined above, in this embodiment, there is also provided an inductor current reconstruction method including: detecting a current through the high-side or low-side switch transistor using the inductor current sampling circuit and outputting a sampled voltage; and during the on-time of the high-side or low-side switch transistor, comparing a voltage slope of the sampled voltage with a voltage slope at the reconstructed signal node and, if the voltage slope of the sampled voltage is not equal to the voltage slope at the reconstructed signal node, adjusting the resistance of the resistor R and/or the capacitance of the capacitor C in the inductor current generator circuit so that the voltage slope of the sampled voltage becomes equal to the voltage slope at the reconstructed signal node.

Detecting the current through the high-side or low-side switch transistor using the inductor current sampling circuit and outputting the sampled voltage may include: detecting the current through the high-side or low-side switch transistor with a current sensor and generating the sampled voltage based on the current through the high-side or low-side switch transistor. Moreover, during the on-time of the high-side or low-side switch transistor, the inductor current generator circuit may be adjusted based on a slope comparison so that a reconstructed signal generated by the inductor current generator circuit matches the inductor current $I_L$. In this way, the generated reconstructed signal can be extended from the on-time of the low-side switch transistor to the on-time of the high-side switch transistor (and vice versa) and thus can always precisely characterize the inductor current $I_L$. That is, the slope of the generated reconstructed signal is kept equal to the slope of the inductor current in both the on-times of the high-side and low-side switch transistors.

In this embodiment, for applications with a small duty cycle, the on-time of the high-side switch transistor HS may be so short as not to allow detection of the current through the high-side switch transistor HS, while the on-time of the low-side switch transistor LS may be sufficiently long. Thus, the sampled voltage Vcs, which varies in the same way as the inductor current $I_L$, may be tracked in the on-time of the low-side switch transistor LS, and the resistor R and/or the capacitor C in the generator circuit may be adjusted according to the voltage slope of the sampled voltage Vcs so that a voltage Vmon of the reconstructed signal is generated, which varies at the same voltage slope as the sampled voltage Vcs and precisely characterizes a waveform of the inductor current $I_L$. The adjusted inductor current generator circuit can generate a simulated reconstructed signal during the on-time of the high-side switch transistor HS, which can precisely characterize the waveform of the inductor current $I_L$ throughout this period. In this way, the waveform of the inductor current $I_L$ can be reconstructed over each entire switching period.

An inductor current reconstruction process performed by the inductor current reconstruction circuit of this embodiment over an entire period will be described with reference to FIG. 3, in which the output voltage Vout is received at the positive input terminal of the Op Amp as an example.

In the on-time of the low-side switch transistor LS (i.e., t1+t2+t3), the current through the resistor R is (Vsw−Vout)/R. In response to this current, the capacitor C is discharged, and Vsw=0 V. Accordingly, the voltage Vmon of the reconstructed signal at one terminal of the capacitor C drops at a slope of Vout/(R*C).

In the blanking interval t1, the first switch K1 is opened, the second switch K2 is closed, and the third switch K3 is opened. The current through the low-side switch transistor LS is not sampled. Moreover, the same signal (i.e., the voltage Vmon of the reconstructed signal) is received at both input terminals of the slope comparator, and a default value is output.

In the detection interval t2, the sampled voltage Vcs of the low-side switch transistor LS is tracked. As noted above, the current through the low-side switch transistor LS is equal to the inductor current. Therefore, the sampled voltage Vcs declines at the same slope as the inductor current (i.e., Vout/L), and the capacitor C is discharged at a rate of −Vout/(R*C). That is, the voltage Vmon of the reconstructed signal drops at a slope of Vout/(R*C). In this interval, the first switch K1 is closed, the second switch K2 is opened, and the third switch K3 is opened. As such, the slope comparator is allowed to compare the sampled voltage Vcs with the voltage Vmon of the reconstructed signal. If the slope of the sampled voltage Vcs is not equal to the slope of the voltage Vmon of the reconstructed signal, then the parameter(s) of the resistor R and/or the capacitor C may be adjusted to make the slope of the sampled voltage Vcs become substantially equal to the slope of the voltage Vmon of the reconstructed signal, i.e., Vout/(R*C)=Vout/L.

In the calibration interval t3, the first switch K1 is closed, the second switch K2 is opened, and the third switch K3 is closed. Thus, the reconstructed signal node is connected to the output terminal of the inductor current sampling circuit. As a result, the voltage Vmon of the reconstructed signal at the reconstructed signal node has the same voltage value and hence the same DC information as the sampled voltage Vcs. At the same time, as the same value is present at the two input terminals of the slope comparator, the capacitor C or the resistor R is not changed at all.

Subsequently, during the on-time t4 of the high-side switch transistor HS, the first switch K1 is opened, the second switch K2 is closed, and the third switch K3 is opened. As a result, the sampling of the current through the low-side switch transistor LS is ceased, and the inductor current generator circuit generates a simulated reconstructed signal which can still precisely characterize the inductor current. Specifically, in the inductor current generator circuit, the current through the resistor R is (Vsw−Vout)/R. In response to this current, the capacitor C is charged, causing the voltage Vmon of the reconstructed signal at the first terminal of the capacitor C to rise at a slope of (Vsw−Vout)/(R*C). Moreover, in the interval t4, the inductor current $I_L$ rises linearly at a slope of (Vsw−Vout)/L, where Vsw=Vin. It is to be noted that after the on-time of the low-side switch transistor LS, the generator circuit has been adjusted (including adjusting the parameter(s) of the capacitor C and/or the resistor R so that Vout/(R*C)=Vout/L) so that (Vsw−Vout)/(R*C)=(Vsw−Vout)/L. Therefore, the simulated reconstructed signal generated by the adjusted inductor current generator circuit also has the same slope as the inductor current and can thus characterize the waveform of the inductor current.

In this way, the waveform of the inductor current can be reconstructed over each entire switching period. Moreover, for switched-mode power supplies with a relatively small duty cycle, the on-time of the low-side switch transistor LS is longer than that of the high-side switch transistor. Accordingly, the detection of the inductor current $I_L$ and the adjustment of the inductor current generator circuit 100 can be conducted during the longer on-time of the low-side switch transistor LS, thereby circumventing the problem of inaccurate inductor current detection due to the influence of a blanking time. Moreover, during the shorter on-time of the high-side switch transistor HS, the adjusted inductor current generator circuit 100 can directly generate the simulated reconstructed signal that precisely characterizes the inductor current $I_L$, effectively addressing the problem that precise inductor current detection throughout the entire period is difficult for switched-mode power supplies with a relatively small duty cycle.

It is to be noted that although the op amp has been described in the above example as receiving the output voltage Vout at its positive input terminal, the present invention is not so limited, because in an alternative example, the Op Amp may also receive, at its positive input terminal, a filtered voltage Vo_filter from the switching node SW. For example, referring to FIG. 4, a low-pass filter may be coupled between the positive input terminal of the Op Amp and the switching node SW to provide the filtered voltage Vo_filter received at the positive input terminal of the Op Amp.

Figure 4:
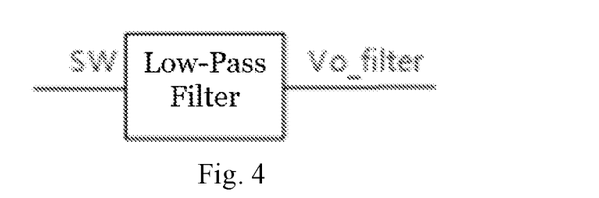
FIG. 4 is a schematic illustration of a circuit according to the first embodiment of the present invention, in which a low-pass filter is connected between a switching node and a positive input terminal of an operational amplifier.

In this case, an inductor current reconstruction process may be performed over an entire period in the following way.

In the on-time of the low-side switch transistor LS, the current through the resistor R is (Vsw−Vout)/R., and the capacitor C is discharged, at this time Vsw=0 V. Accordingly, the voltage Vmon of the reconstructed signal drops at a slope of Vout/(R*C).

In the blanking interval t1 of the low-side switch transistor LS, the current through the low-side switch transistor LS is not sampled. Moreover, the same signal (i.e., the voltage Vmon of the reconstructed signal) is received at both input terminals of the slope comparator, and a default value is output.

In the detection interval t2, the sampled voltage Vcs of the low-side switch transistor LS is tracked. In this interval, the sampled voltage Vcs declines at the same slope as the inductor current (i.e., Vout/L), and the capacitor in the inductor current reconstruction circuit is discharged at a rate of −Vo_filter/(R*C). That is, the voltage Vmon of the reconstructed signal drops at a slope of Vo_filter/(R*C). The slope comparator compares the sampled voltage Vcs with the voltage Vmon of the reconstructed signal. If the slope of the sampled voltage Vcs is not equal to the slope of the voltage Vmon of the reconstructed signal, the parameter(s) of the resistor R and/or the capacitor C is/are adjusted to make the slope of the sampled voltage Vcs become substantially equal to the slope of the voltage Vmon of the reconstructed signal, i.e., Vo_filter/(R*C)=Vout/L.

In the calibration interval t3, the voltage Vmon of the reconstructed signal at the reconstructed signal node has the same voltage value and hence the same DC information as the sampled voltage Vcs. At the same time, as the same value is present at both input terminals of the slope comparator, the capacitance C or the resistance R will not be changed.

During the on-time t4 of the high-side switch transistor HS, the inductor current $I_L$ rises linearly at a slope of (Vsw−Vout)/L, and the current through the resistor R is (Vsw−Vout)/R. The current-controlled current source cccs uses this current to charge the capacitor C, causing the voltage Vmon of the reconstructed signal to rise at a slope of (Vsw−Vo_filter)/(R*C). It is to be noted that after the on-time of the low-side switch transistor LS, the generator circuit has been adjusted (including adjusting the parameter(s) of the capacitor C and/or the resistor R so that Vo_filter/(R*C)=Vout/L) so that (Vsw−Vo_filter)/(R*C)=(Vsw−Vout)/L. Therefore, the simulated reconstructed signal generated by the adjusted inductor current generator circuit also has the same slope as the inductor current and can thus characterize the waveform of the inductor current.

Embodiment 2

In the first embodiment, the inductor current sampling circuit outputs the sampled voltage Vcs by detecting the current through the low-side switch transistor LS. Moreover, during the on-time of the low-side switch transistor LS, it tracks the sampled voltage Vcs and compares it with the voltage at the reconstructed signal node. Therefore, the first embodiment is particularly suitable for use in applications with a relatively small duty cycle. In contrast, in a second embodiment, there is provided an inductor current sampling circuit, which outputs a sampled voltage Vcs by detecting a current through a high-side switch transistor HS. Moreover, during an on-time of the high-side switch transistor HS, it tracks the sampled voltage Vcs and compares it with a voltage at a reconstructed signal node. Therefore, this second embodiment is particularly suitable for use in applications with a relatively large duty cycle.

This embodiment is exemplified below with reference to FIGS. 5 and 6 also in the context of a power circuit of a switched-mode power supply being implemented as a buck circuit.

Figure 5:
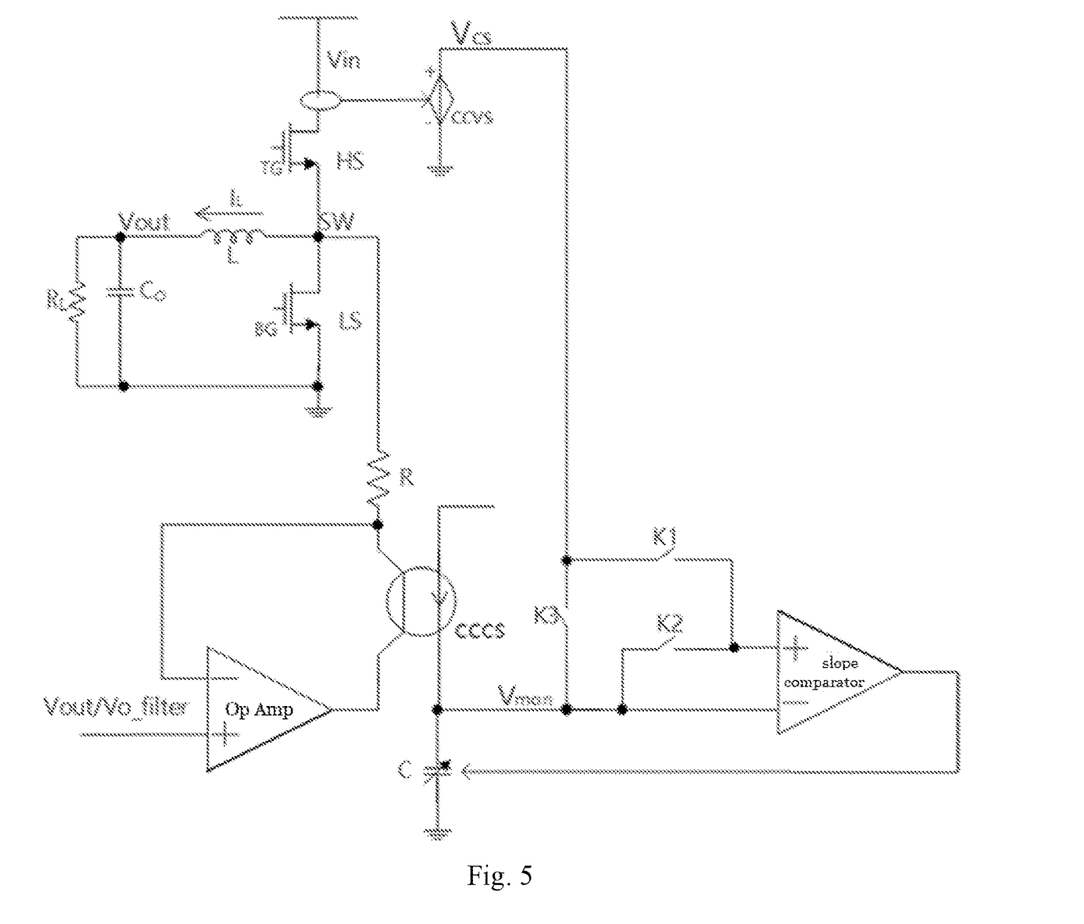
FIG. 5 is a schematic illustration of a circuit including an inductor current reconstruction circuit according to a second embodiment of the present invention.
Figure 6:
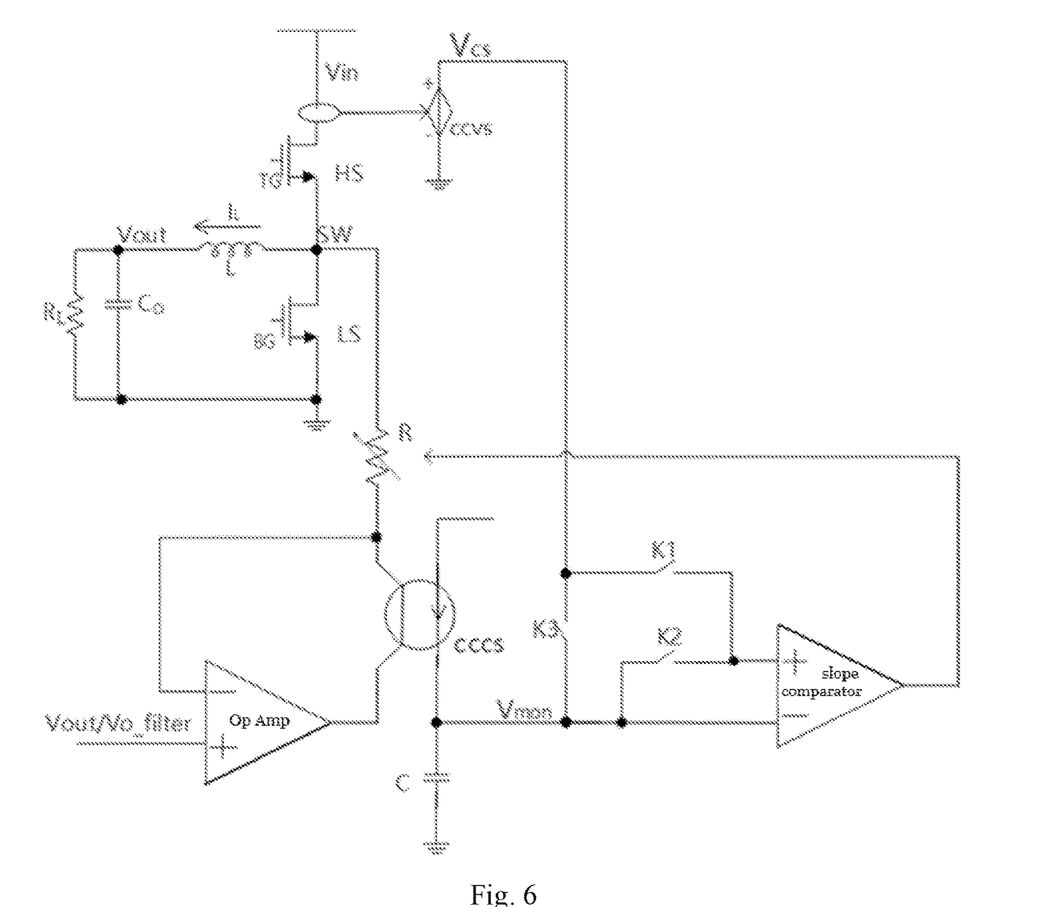
FIG. 6 is a schematic illustration of another circuit including an inductor current reconstruction circuit according to the second embodiment of the present invention.

Specifically, referring to FIGS. 5 and 6, the inductor current sampling circuit is configured to output the sampled voltage Vcs by detecting the current through the high-side switch transistor HS. In specific embodiments, the inductor current sampling circuit includes a current-controlled voltage source ccvs capable of generating the sampled voltage Vcs for the high-side switch transistor HS based on the current $I_L$ through the high-side switch transistor HS. Specifically, during the on-time of the high-side switch transistor HS, an input voltage Vin charges an output capacitor Co through the high-side switch transistor HS. As a result, an inductor current $I_L$ is equal to the current through the high-side switch transistor HS, and both increase linearly at a slope of (Vsw−Vout)/L. Therefore, the sampled voltage Vcs generated by the current-controlled voltage source ccvs based on the current through the high-side switch transistor HS rises at the same slope as the inductor current $I_L$ (i.e., (Vsw−Vout)/L).

The inductor current generator circuit is also configured to track the sampled voltage Vcs and generate a reconstructed signal varying at the same slope as the sampled voltage Vcs, during the on-time of the high-side switch transistor HS and to generate a simulated reconstructed signal during an on-time of a low-side switch transistor LS. In this way, a waveform of the inductor current $I_L$ can be reconstructed over each entire switching period.

Similar to that of the first embodiment, the inductor current generator circuit of this embodiment also includes a resistor R, an Op Amp, a current-controlled current source cccs, a capacitor C and a slope comparator. However, differing from the first embodiment, the slope comparator in this embodiment is configured to, during the on-time of the high-side switch transistor HS, receive the sampled voltage Vcs at its positive input terminal and compare the ascending voltage slope of the sampled voltage Vcs with that of a voltage Vmon of the reconstructed signal. The inductor current generator circuit may be adjusted based on a result of the comparison.

In an embodiment as shown in FIG. 5, the capacitor C is a variable capacitor, and when the voltage slopes are unequal, the capacitance of the variable capacitor may be adjusted to make the voltage slopes become equal. In an embodiment as shown in FIG. 6, the resistor R is a variable resistor, and when the voltage slopes are unequal, the resistance of the variable resistor may be adjusted to make the voltage slopes become equal. Of course, in other embodiments, both a variable resistor and a variable capacitor may be employed, and when the voltage slopes are unequal, the parameter(s) of at least one of the variable resistor and the variable capacitor may be adjusted.

Specifically, in the on-time of the high-side switch transistor HS, the sampled voltage Vcs (and hence the inductor current $I_L$) rises at a slope of (Vsw−Vout)/L, and the voltage Vmon of the reconstructed signal rises at a slope of (Vsw−Vout)/(R*C). If the slope of the sampled voltage Vcs (i.e., (Vsw−Vout)/L) is greater than that of the voltage Vmon of the reconstructed signal (i.e., (Vsw−Vout)/(R*C)), then in the embodiment of FIG. 5, the capacitance of the capacitor C may be reduced, and in the embodiment of FIG. 6, the resistance of the resistor R may be reduced. On the contrary, of the slope of the sampled voltage Vcs (i.e., (Vsw−Vout)/L) is smaller than that of the voltage Vmon of the reconstructed signal (i.e., (Vsw−Vout)/(R*C)), then in the embodiment of FIG. 5, the capacitance of the capacitor C may be increased, and in the embodiment of FIG. 6, the resistance of the resistor R may be increased. In this way, the voltage slope of the sampled voltage Vcs (i.e., (Vsw−Vout)/L) can be kept substantially the same as that of the voltage Vmon of the reconstructed signal (i.e., (Vsw−Vout)/(R*C)), i.e., (Vsw−Vout)/L=(Vsw−Vout)/(R*C). As such, the voltage Vmon of the reconstructed signal corresponds to the same DC signal as the sampled voltage Vcs and can thus precisely characterize the inductor current $I_L$.

It is just the adjustment made to the resistor R and/or capacitor C during the on-time of the high-side switch transistor HS that makes (Vsw−Vout)/L equal to (Vsw−Vout)/(R*C).

Likewise, a descending voltage slope of the voltage Vmon of the reconstructed signal ((Vsw−Vout)/(R*C)) can be made equal to a descending slope of the inductor voltage VL (Vout/L) during the on-time of the low-side switch transistor LS, i.e., Vsw=0 and Vout/(R*C)=Vout/L. In this way, during the on-time of the low-side switch transistor LS, the simulated reconstructed signal generated by the inductor current generator circuit (mimicking the voltage Vmon of the reconstructed signal) can also precisely characterize the inductor current $I_L$.

Thus, the inductor current reconstruction circuit provided in this embodiment can precisely reconstruct the waveform of the inductor current $I_L$ over each entire switching period.

It is to be noted that the inductor current reconstruction circuit provided in this embodiment is particularly suitable for use in switched-mode power supplies with a relatively large duty cycle. Specifically, in applications with a relatively large duty cycle, the on-time of the low-side switch transistor LS may be so short as to disallow detection of the current through the low-side switch transistor LS. On the other hand, the on-time of the high-side switch transistor HS is sufficiently long. Thus, the sampled voltage Vcs may be tracked in real time, and the inductor current generator circuit may be adjusted in real time, during the on-time of the high-side switch transistor HS, so that the reconstructed signal generated by the inductor current generator circuit can characterize the waveform of the inductor current $I_L$. Additionally, the waveform reconstruction based on the high-side switch transistor HS could be extended to that based on the on-time of the low-side switch transistor LS.

Similar to the first embodiment, in this embodiment, the on-time of the high-side switch transistor HS may also include: an initial blanking interval t1, in which the sampled voltage Vcs is not tracked; and a detection interval t2 succeeding the blanking interval t1, in which the sampled voltage Vcs is tracked, and the inductor current generator circuit is adjusted in real time. With this design, high-precision reconstruction of the inductor current $I_L$ can be achieved. Accordingly, in application with a relatively large duty cycle, since the on-time of the high-side switch transistor HS is much longer than the blanking interval t1, tracking of the sampled voltage Vcs and real-time adjustment of the inductor current generator circuit could be accomplished within the on-time of the high-side switch transistor HS.

Additionally, the on-time of the high-side switch transistor HS may further include a calibration interval t3, in which the voltage Vmon of the reconstructed signal at the reconstructed signal node is aligned with the sampled voltage Vcs so that DC information at the reconstructed signal node (i.e., DC information of the voltage Vmon of the reconstructed signal) is the same as DC information of the sampled voltage Vc. In other words, after elapse of the detection interval t2 and the calibration interval t3, the voltage Vmon of the reconstructed signal at the reconstructed signal node has both the same voltage value and the same voltage slope as the sampled voltage Vcs and can thus more precisely characterize the waveform of the inductor current $I_L$.

Likewise, in this embodiment, a switching circuit may be employed to enable the inductor current generator circuit to perform different functions in different time intervals. Reference can be made to the above description of the first embodiment, and further description thereof is omitted herein.

In this embodiment, there is also provided a switched-mode power supply. Specifically, with reference to FIGS. 1 to 2 and 5 to 6, the switched-mode power supply may include a high-side switch transistor HS, a low-side switch transistor LS and an inductor L. The switched-mode power supply may further include the inductor current reconstruction circuit as defined above. The inductor current sampling circuit in the inductor current reconstruction circuit is configured to output a sampled voltage by detecting a current through the high-side or low-side switch transistor LS. The inductor current generator circuit in the inductor current reconstruction circuit is coupled to a switching node SW between the high-side HS and low-side LS switch transistors.

The switched-mode power supply may be of any suitable topology, such as buck, boost or buck-boost. For example, the switched-mode power supply may include a high-side switch transistor HS, a low-side switch transistor LS, an inductor L and an output capacitor Co. One terminal of the high-side switch transistor HS may be connected to a terminal of the low-side switch transistor LS and act as a switching node SW. One terminal of the inductor L may be coupled to the switching node SW.

It is also to be noted that while the present invention has been described with reference to several preferred embodiments, the forgoing embodiments are not intended to limit the invention. In light of the teachings hereinabove, any person familiar with the art may make various possible variations and changes to the disclosed embodiments or modify them into equivalent alternatives, without departing from the scope thereof. Accordingly, any and all such simple variations, equivalent alternatives and modifications made to the foregoing embodiments without departing from the scope of the invention are intended to fall within the scope thereof.

It is to be also noted that, as used herein, the terms "first", "second", "third" and the like are only meant to distinguish various components, elements, steps, etc. from each other rather than necessarily indicate logical or sequential orderings thereof, unless otherwise indicated or specified. It is also to be recognized that the terminology used herein is for the purpose of describing particular embodiments only, and is not intended to limit the scope of the present invention. It must be noted that as used herein and in the appended claims, the singular forms "a" and "an" include the plural reference unless the context clearly dictates otherwise. Thus, for example, a reference to "a step" or "a means" is a reference to one or more steps or means and may include sub-steps and sub-means. All conjunctions used are to be understood in the most inclusive sense possible. Thus, the term "or" should be understood as having the definition of a logical "or" rather than that of a logical "exclusive or" unless the context clearly necessitates otherwise.

What is claimed is:

1. An inductor current reconstruction circuit for use in a switched-mode power supply, the switched-mode power supply comprising high-side and low-side switch transistors which are connected in series as well as an inductor, a first terminal of the inductor connected to a first terminal of the low-side switch transistor, a second terminal of the inductor connected to an output terminal of the switched-mode power supply, the inductor current reconstruction circuit comprising:

an inductor current sampling circuit configured to detect a current through the high-side or low-side switch transistor and thereby output a sampled voltage; and an inductor current generator circuit comprising a resistor, an operational amplifier, a current-controlled current source and a capacitor and slope comparator, a first terminal of the resistor connected to the first terminal of the low-side switch transistor, a second terminal of the resistor connected to a first terminal of the current-controlled current source, a positive input terminal of the operational amplifier configured to receive an output voltage from the switched-mode power supply or a filtered voltage from the switched-mode power supply, a negative input terminal of the operational amplifier connected to the second terminal of the resistor, an output terminal of the operational amplifier connected to a control terminal of the current-controlled current source, a first terminal of the capacitor connected to a second terminal of the current-controlled current source and serving as a reconstructed signal node, a second terminal of the capacitor being grounded, the current-controlled current source configured to charge or discharge the capacitor according to a current through the resistor, a negative input terminal of the slope comparator connected to the first terminal of the capacitor, a positive input terminal of the slope comparator configured to receive the sampled voltage and compare a voltage slope of the sampled voltage with a voltage slope at the reconstructed signal node, an output terminal of the slope comparator connected to the resistor and/or the capacitor and configured to, when the voltage slope of the sampled voltage is not equal to the voltage slope at the reconstructed signal node, adjust the resistance of the resistor and/or the capacitance of the capacitor so that the voltage slope at the reconstructed signal node becomes equal to the voltage slope of the sampled voltage.

2. The inductor current reconstruction circuit of claim 1, wherein the inductor current sampling circuit is configured to detect the current through the high-side switch transistor and thereby output the sampled voltage,
wherein the slope comparator is configured to receive the sampled voltage and the voltage at the reconstructed signal node, compare the voltage slope of the sampled voltage with the voltage slope at the reconstructed signal node and make the voltage slope at the reconstructed signal node equal to the voltage slope of the sampled voltage.

3. The inductor current reconstruction circuit of claim 2, wherein the current-controlled current source is configured to charge the capacitor during an on-time of the high-side switch transistor and discharge the capacitor during an on-time of the low-side switch transistor, thereby obtaining the voltage at the reconstructed signal node, wherein the voltage slope at the reconstructed signal node is the same as a slope of a current through the inductor.

4. The inductor current reconstruction circuit of claim 1, wherein the inductor current sampling circuit is configured to detect the current through the low-side switch transistor and thereby outputting the sampled voltage,
wherein the slope comparator is configured to receive the sampled voltage and the voltage at the reconstructed signal node, compare the voltage slope of the sampled voltage with the voltage slope at the reconstructed signal node and make the voltage slope at the reconstructed signal node equal to the voltage slope of the sampled voltage.

5. The inductor current reconstruction circuit of claim 4, wherein the current-controlled current source is configured to charge the capacitor during an on-time of the high-side switch transistor and discharge the capacitor during an on-time of the low-side switch transistor, thereby obtaining the voltage at the reconstructed signal node, wherein the voltage slope at the reconstructed signal node is the same as a slope of a current through the inductor.

6. The inductor current reconstruction circuit of claim 1, wherein the inductor current sampling circuit comprises a current-controlled voltage source for generating the sampled voltage based on the detected current through the high-side or low-side switch transistor.

7. The inductor current reconstruction circuit of claim 1, wherein the inductor current generator circuit further comprises a first switch, a second switch and a third switch, the first switch connected between an output terminal of the inductor current sampling circuit and the positive input terminal of the slope comparator, the second switch connected between the reconstructed signal node and the positive input terminal of the slope comparator, the third switch connected between the output terminal of the inductor current sampling circuit and the reconstructed signal node.

8. The inductor current reconstruction circuit of claim 7, wherein an on-time of the high-side or low-side switch transistor comprises a blanking interval, a detection interval and a calibration interval, wherein:
in the blanking interval, the first switch is opened, the second switch is closed, and the third switch is opened, causing the positive and negative input terminals of the slope comparator to receive the voltage at the reconstructed signal node;
in the detection interval, the first switch is closed, the second switch is opened, and the third switch is opened, causing the positive and negative input terminals of the slope comparator to receive the sampled voltage and the voltage at the reconstructed signal node, respectively; and
in the calibration interval, the first switch is closed, the second switch is opened, and the third switch is closed, thereby connecting the reconstructed signal node to the output terminal of the inductor current sampling circuit and making the voltage at the reconstructed signal node equal to the sampled voltage.

9. An inductor current reconstruction method using the inductor current reconstruction circuit of claim 1, comprising:
detecting a current through the high-side or low-side switch transistor and thereby outputting a sampled voltage by the inductor current sampling circuit;
during an on-time of the high-side or low-side switch transistor, comparing a voltage slope of the sampled voltage with a voltage slope at the reconstructed signal node and, when the voltage slope of the sampled voltage is not equal to the voltage slope at the reconstructed signal node, adjusting the resistance of the resistor and/or the capacitance of the capacitor in the inductor current generator circuit so that the voltage slope at the reconstructed signal node becomes equal to the voltage slope of the sampled voltage.

10. The inductor current reconstruction method of claim 9, wherein the inductor current sampling circuit detects the current through the high-side switch transistor and thereby outputs the sampled voltage, and during the on-time of the high-side switch transistor, the sampled voltage is received and its voltage slope is compared with the voltage slope at the reconstructed signal node, followed by the voltage slope at the reconstructed signal node being made equal to the voltage slope of the sampled voltage,
wherein the inductor current reconstruction method further comprises, charging the capacitor during the on-time of the high-side switch transistor and discharging the capacitor during the on-time of the low-side switch transistor so that the voltage slope at the reconstructed signal node is the same as a current through the inductor.

11. The inductor current reconstruction method of claim 9, wherein the inductor current sampling circuit detects the current through the low-side switch transistor and thereby outputs the sampled voltage, and during the on-time of the low-side switch transistor, the sampled voltage is received and a voltage slope of the sampled voltage is compared with the voltage slope at the reconstructed signal node, followed by the voltage slope at the reconstructed signal node being made equal to the voltage slope of the sampled voltage,
wherein the inductor current reconstruction method further comprises, charging the capacitor during the on-time of the high-side switch transistor and discharging the capacitor during the on-time of the low-side switch transistor so that the voltage slope at the reconstructed signal node is the same as a current through the inductor.

12. The inductor current reconstruction method of claim 9, wherein the on-time of the high-side or low-side switch transistor comprises a blanking interval, a detection interval and a calibration interval, wherein:
in the blanking interval, the positive and negative input terminals of the slope comparator receives a voltage at the reconstructed signal node;
in the detection interval, the positive and negative input terminals of the slope comparator receives the sampled voltage and the voltage at the reconstructed signal node, respectively, and compares the voltage slope of the sampled voltage with the voltage slope at the reconstructed signal node; and in the calibration interval, the reconstructed signal node is connected to the output terminal of the inductor current sampling circuit, thereby making the voltage at the reconstructed signal node equal to the sampled voltage.

13. A switched-mode power supply, comprising the inductor current reconstruction circuit of claim 1, wherein the inductor current sampling circuit is configured to detect a current through the high-side or low-side switch transistor to output a sampled voltage, and the inductor current generator circuit is connected to a node between the low-side switch transistor and the high-side switch transistor.

* * * * *